Jan. 20, 1970     P. W. HAIT     3,490,490
VACUUM CONNECTOR INCLUDING HEMISPHERICAL ELEMENTS
INTERCONNECTED IN FACED-AWAY RELATION
Filed Feb. 19, 1968
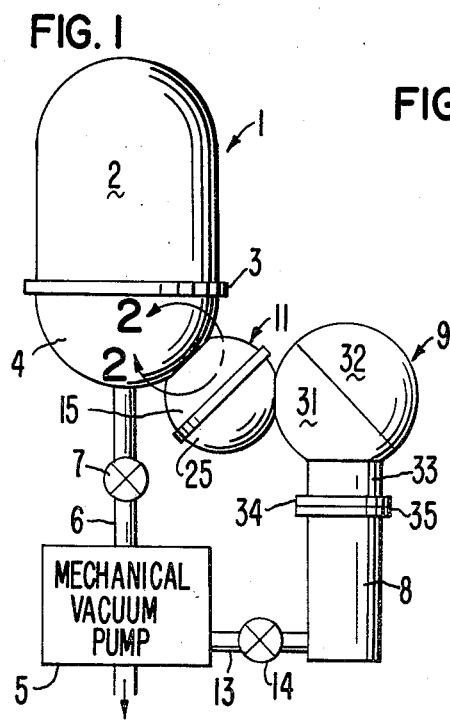
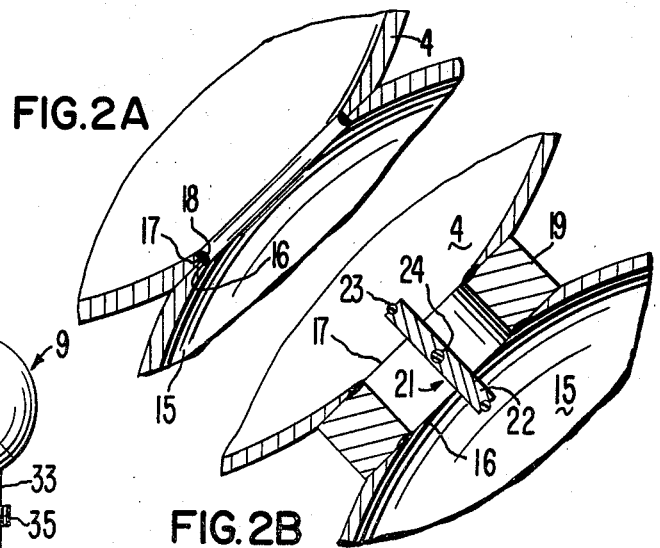
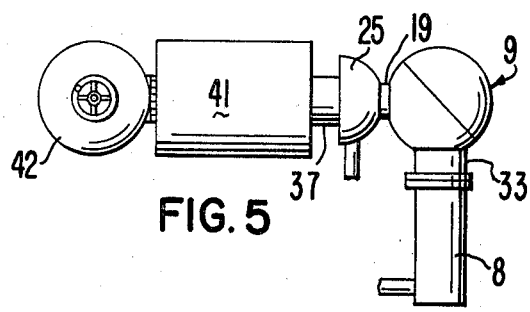
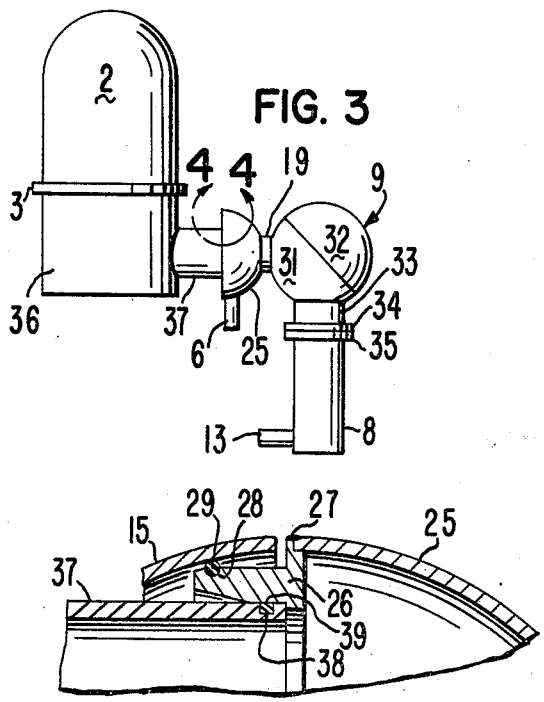
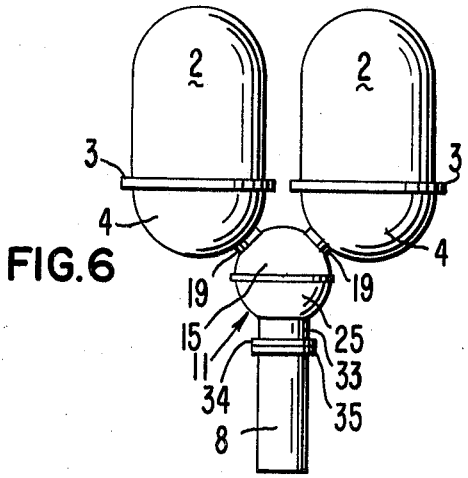
INVENTOR
PAUL W. HAIT
BY
Leon F. Herbert
ATTORNEY

United States Patent Office 3,490,490
Patented Jan. 20, 1970

---

3,490,490
VACUUM CONNECTOR INCLUDING HEMI-
SPHERICAL ELEMENTS INTERCONNECTED
IN FACED-AWAY RELATION
Paul W. Hait, Beaverton, Oreg., assignor to Varian
Associates, Palo Alto, Calif., a corporation of
California
Filed Feb. 19, 1968, Ser. No. 706,448
Int. Cl. F16l 25/00
U.S. Cl. 137—565                                        8 Claims

ABSTRACT OF THE DISCLOSURE

A vacuum connecter and vacuum systems using same are disclosed. The vacuum connecter includes at least two hemispherical sheet metal elements. The hemispherical elements each include an opening therein. The hemispheres are disposed with the open lip portions thereof facing away from each other and with the openings aligned. A vacuum tight connection interconnects the marginal lips of the aligned openings to provide a vacuum passageway between the first and second hemispheres through the aligned openings. In one embodiment, the marginal lips of the aligned openings are welded together to form a vacuum tight joint therebetween. In another embodiment, the connecter, which interconnects the openings, comprises a ring joined at its ends to the marginal lips of the aligned openings. In the latter case, the ring may incorporate a butterfly valve for valving the flow of gas between the two hemispheres. One of the first two hemispheres may include a third hemispherical member joined thereto in mutually opposed relation to define a sphere joined to the first hemisphere. The vacuum connecter including the hemispherical elements is disclosed as utilized in a vacuum system as a vacuum connecter interconnecting a chamber to be evacuated with a vacuum pump.

Description of the prior art

Heretofore, vacuum systems have been built which employ standard types of vacuum connecters for interconnecting a chamber to be evacuated with a vacuum pump. Such standard fittings have included T's, elbows, Y's, crosses and combinations thereof. When these standard fittings are employed in a vacuum system requiring relatively high through-puts, as of in the order of thousands of liters per second, the fittings have to be relatively large in size as of 8 inches or larger in diameter. These relatively large standard fittings are very expensive, bulky and heavy.

In the high fluid pressure art, i.e. pressures on the order of thousands of pounds per square inch, it is known from U.S. Patents 3,186,431, issued June 1, 1965 that a number of high pressure pipes can be interconnected by means of a spherical manifold to reduce the weight and complexity of the manifolding structure. In this case, the spherical manifold was constructed by joining two hemispherical sheet metal elements together at their adjoining lip portions. Circular holes were cut in the spherical manifold and the pipes were welded to the external marginal lips of the openings in the sphere. While the spherical manifold offers certain advantages as compared to the use of standard pipe fittings, the sphere, with its connecting pipes, has certain disadvantages in that the pipes represent less than an optimum utilization of a material to form a vacuum envelope and, moreover, these pipes for any appreciable length tend to constrict the gas flow therethrough.

Summary of the present invention

The principal object of the present invention is the provision of an improved vacuum connecter and vacuum systems using same.

One feature of the present invention is the provision, in a vacuum connecter, of first and second sheet metal hemispherical elements disposed with their lip portions facing away from each other and each hemisphere having a circular opening. The circular openings are aligned and a vacuum tight connection is provided interconnecting the marginal lips of the aligned openings to provide a vacuum passaeway between the hemispheres. The axial length of the passageway interconnecting the hemispheres is dimensioned less than the diameter of the openings, whereby the gas conductance through the passageway between the hemispheres is not appreciably limited.

Another feature of the present invention is the same as the preceding feature wherein one of the hemispheres is joined to a third hemisphere with the third hemisphere sealed at its lip to the lip of the first hemisphere to form a generally spherical structure joined to the first hemisphere.

Another feature of the present invention is the same as any one or more of the preceding features including a butterfly valve disposed in the passageway communicating between the aligned openings in the first and second hemispheres for controlling the flow of gas through the connecter.

Another feature of the present invention is the same as the second feature wherein the generally spherical structure includes a butterfly valve disposed diametrically across the interior of the sphere and substantially at the joint between the second and third hemispheres for controlling the flow of gas through the composite vacuum connecter.

Another feature of the present invention is the same as any one or more of the preceding features including the combination of a chamber to be evacuated and a vacuum pump for evacuating the chamber with the vacuum connecter connected in between the vacuum pump and the chamber to form the gas connection therebetween.

Other features and advantages of the present invention will become apparent upon a perusal of the following specification taken in connection with the accompanying drawings wherein:

Brief description of the drawings

FIG. 1 is a side elevational view, partly in block diagram form, depicting a vacuum system incorporating features of the present invention, FIG. 2A is an enlarged sectional view of a portion of the structure of FIG. 1 delineated by line 2—2, FIG. 2B is a view similar to that of FIG. 2A depicting an alternative embodiment of the present invention, FIG. 3 is a side elevational view of an alternative vacuum system incorporating features of the present invention, FIG. 4 is an enlarged cross-sectional view of a portion of the structure of FIG. 3 delineated by line 4—4, and FIGS. 5 and 6 are side elevational views of alternative vacuum systems incorporating features of the present invention.

Description of the preferred embodiments

Referring now to FIG. 1, there is shown a vacuum system 1 incorporating features of the present invention. The vacuum system 1 includes a bell jar 2 inverted over an annular base plate 3 having a hemispherical sheet metal sump 4 sealed to the base plate 3 at the marginal lip of the hemisphere 4.

A mechanical vacuum pump 5 is connected to the bottom of the sump 4 by means of an exhaust tubulation 6 and a control valve 7. A diffusion pump 8 is connected to the hemispherical sump 4 via a hollow spherical cryogenic trap 9 and a hollow connecting sphere 11.

The mechanical pump 5 is connected for evacuating the diffusion pump 8 via exhaust tubulation 13 and a control valve 14.

Spheres 9 and 11 provide a high gas conductance vacuum connection between the sump 4 and the pump 8. Sphere 11 includes a first sheet metal hemispherical element 15 having a circular opening 16 therein (see FIG. 2A). The hemispherical sump 4 also includes a circular opening 17 preferably having the same inside diameter as the circular opening 16. The openings 16 and 17 are aligned and the hemispheres 4 and 15 are joined together by means of a circular welded seam 18 at the mating marginal lips of the circular openings 16 and 17.

Referring now to FIG. 2B, there is shown an alternative structure for sealing hemispheres 4 and 15 together. In this case, the openings 16 and 17 are aligned and an annular metallic collar 19 is disposed encircling the openings 16 and 17 in between the hemispheres 4 and 15. The marginal lips of the openings 16 and 17 are welded to the marginal edge of the collar 19 to provide a gas tight connection interconnecting the two hemispheres 4 and 15. In certain embodiments, it is desirable to be able to valve off one of the hemispheres 4 relative to the other hemisphere 15. In such a case, a butterfly valve 21 is mounted in the annular collar 19. The butterfly valve 21 includes a circular valve disk plate 22 having a peripheral resilient O-ring 23 retained within a peripheral groove in the plate 22. The valve disk 22 is pivotably supported on a valve stem 24 passing diametrically across the annular collar 19. Suitable O-rings, not shown, are provided for sealing the valve stem 24 to the collar 19. The external end of the valve stem 4 includes a handle or knob, not shown, for controlling the position of the valve disk 22 for valving the flow of gas from one hemisphere to the adjoining hemisphere through the internal bore of the annular collar 19.

Referring again to FIG. 1, the sphere 11 includes a second hemispherical element 25 which is disposed facing the other hemispherical member 15. The two hemispherical members are sealed together in a vacuum tight manner at their mating lips. As an alternative to providing the butterfly valve 21 in the collar 19 between the sump 4 and the hemisphere 15, the butterfly valve 21 may be incorporated in the joint between the hemispheres 15 and 25. In such a case, the lips of the hemispherical sections 15 and 25 are sealed to the annular collar 19 which contains the butterfly valve 21 as by welding or by suitable O-ring seals, not shown.

A suitable O-ring seal for sealing the hemispheres 15 and 25 together is depicted in FIG. 4 wherein it is seen that an annular flange member 26 is welded to the lip of hemisphere section 25 via peripheral weld seam 27. The annular flange 26 includes a peripheral recess 28 for containing a resilient O-ring 29. The O-ring 29 is compressed into sealing engagement with the inside surface of the lip portion of the other hemispherical section 15, thereby forming a vacuum tight seal between hemisphere 15 and ring 26. The ring 26 may have a smooth cylindrical inside bore as does collar 19 and it may contain the butterfly valve 21 in the manner as shown in FIG. 2B.

Spherical connecter 11 is joined to spherical connecter 9 in the same manner as the hemispherical sump 4 is joined to the spherical connecter 11. Spherical connecter 9 includes first and second hemispherical sections 31 and 32 sealed together at their mating lip portions by means of a suitable O-ring seal of a type which may be similar to that shown in FIG. 4. Spherical connecter 9 includes a cryogenic trap therein, not shown, for trapping the back streaming of oil from the oil diffusion pump 8 into the bell jar 2 through connecters 9, 11 and the sump 4. The spherical cryogenic trap structure is disclosed and claimed in copending U.S. application Ser. No. 706,494, filed Feb. 19, 1968 and assigned to the same assignee as the present invention.

The spherical connector 9 is joined to the oil diffusion pump 8 via a cylindrical pipe 33 welded to the inside marginal edge of a circular opening in the lower hemispherical section 31. The end of the pipe 33 is provided with an annular flange 34 which is bolted to a mating flange 35 at the mouth of the oil diffusion pump 8.

Referring now to FIG. 3, there is shown an alternative vacuum system incorporating features of the present invention. The structure of FIG. 3 is similar to that of FIG. 1 except that the sump 4 of FIG. 1 is replaced by a right circular cylindrical sheet metal sump 36 which connected to a transition hemisphere 25, as previously described above with regard to FIG. 1, via a cylindrical pipe 37. The connection between pipe 37 and the transition hemisphere 25 is shown in greater detail in FIG. 4. The end of the pipe 37 includes a peripheral retaining groove 38 containing a resilient O-ring 39, which bears in sealing engagement with the inside surface of annular flange 26, to provide a gas tight seal between the pipe 37 and the transition hemisphere 25. The exhaust tubulation 6 is connected into the transition hemisphere 25 and a butterfly valve 21, as shown in FIG. 2B, is connected in the annular collar 19 between the transition hemisphere 25 and the hemispherical section 31 of the cryogenic trap 9.

Referring now to FIG. 5 there is shown an alternative vacuum system incorporating features of the present invention. This vacuum system is substantially the same as that of FIG. 3 except that the bell jar 2, base plate 3, and sump 36 are replaced by a cylindrical vacuum chamber 41 having a hinged door 42 disposed at one end thereof for opening and closing the end of the chamber 41. In addition, exhaust pipe 37 is connected directly into the center of the end wall of the cylindrical chamber 41.

Referring now to FIG. 6, there is shown an alternative vacuum system of the present invention. The system of FIG. 6 is similar to that previously described with regard to FIG. 1 except that two bell jars 2 together with their base plates 3 and sumps 4 are connected to a spherical connecter 11 via collars 19 containing butterfly valves 21, in the manner as described above with regard to FIG. 2B. The vacuum diffusion pump 8 is connected to the lower hemisphere 25 of the spherical connecter 11. An advantage of the system of FIG. 8 is that one pump and spherical connecter 11 may be utilized for operating two bell jars. The bell jars may be independently pumped down to high vacuum by means of the control valves 21 contained within the collars 19.

In typical hemispherical connecting elements of the present invention, such as elements 4, 15, 25 and 31, the sheet metal is typically 304 stainless steel which has very low outgasing and which is readily welded. The sheet metal typically has a thickness ranging between 0.040 inch and 0.060 inch.

The advantage of using the hemispherical connecting elements in a vacuum system, as compared to the use of conventional T's elbows, crosses and the like, is that the walls of the hemispherical elements may be made much thinner than the corresponding thickness of the walls used for the standard pipe fittings. Typical cross-sectional dimensions for the gas passageways in high vacuum systems of this type range from 5 inches on up and standard fittings with these dimensions are very expensive. Moreover, the standard fittings require relatively heavy flange structures for connecting the standard elements together and these flanges are expensive, bulky and heavy. Utilizing the hemispheres of the present invention, they may be readily welded together without the necessity of a special flange. In addition, the hemispherical elements provide a vaccum connecter having greater gas conductance for an equivalent length than standard pipe fittings.

Since many changes could be made in the above construction and many apparently widely different embodi-

What is claimed is:

1. In a vacuum connector for providing a vacuum passageway communicating therethrough between two devices to be interconnected, means forming first and second sheet metal generally hemispherically shaped members, each of said hemispherical members having a circular opening cut therethrough, the improvement wherein, said hemispheres are disposed with the lip portions of said hemispheres facing away from each other and with said openings being aligned, means forming a vacuum tight connection interconnecting the marginal lips of said aligned openings to provide a vacuum passageway between said first and second hemispheres through said aligned openings, and said connection between said aligned openings having an axial length less than the diameter of said openings.

2. The apparatus of claim 1 including, a third sheet metal generally hemispherically shaped member, said third hemispherical member disposed in mutually opposed relation to said second hemispherical member with their respective lip portions facing each other, and means forming a vacuum tight joint between the lips of said second and third hemispheres, thus forming a generally spherical structure joined to said first hemisphere.

3. The apparatus of claim 1 including, means forming a butterfly valve structure disposed in said passageway communicating between said aligned openings in said first and second hemispheres for controlling the flow of gas between said first and second hemispheres.

4. The apparatus of claim 1 wherein said first and second hemispheres have substantially different radii of curvature.

5. The apparatus of claim 1 including a third generally hemispherically shaped member, said third hemispherical member having a circular opening cut therethrough, said third hemispherical member disposed with its lip portion facing away from the similar lip portion of the second hemisphere, and said second hemisphere including a second opening therein aligned with the opening in said third hemisphere, means forming a vacuum tight connection interconnecting the marginal lips of said aligned openings in said second and third hemispheres to provide a vacuum passageway through said aligned openings, and said connection between said aligned openings in said second and third hemispheres having an axial length less than the diameter of said openings.

6. The apparatus of claim 2 including, means forming a butterfly valve structure disposed diametrically across the interior of said generally spherically shaped structure at said joint between said second and third hemispheres for controlling the flow of gas through the composite vacuum connector.

7. The apparatus of claim 2 including, in combination, means forming a chamber to be evacuated, means forming a vacuum pump for evacuating said chamber, and wherein the vacuum connecter including said first, second and third hemispheres is connected in between said vacuum pump and said chamber to be evacuated.

8. The apparatus of claim 1, wherein said vacumm tight connection interconnecting the marginal lips of said aligned openings comprises a welded seam between the marginal lips of the aligned openings in said first and second hemispheres.

References Cited

UNITED STATES PATENTS

| | | | |
|---|---|---|---|
| 2,860,663 | 11/1958 | Kroeger et al. | 137—561 |
| 3,186,431 | 6/1965 | Moore | 137—561 |

HENRY S. JAUDON, Primary Examiner